United States Patent [19]
Plunkett et al.

[11] 3,994,624
[45] Nov. 30, 1976

[54] WATER ENVELOPE PUMP AND TANK SYSTEM

[75] Inventors: John A. Plunkett, Spring; Herbert H. Hodgeman, Houston, both of Tex.

[73] Assignee: Daniel Industries, Inc., Houston, Tex.

[22] Filed: Nov. 24, 1975

[21] Appl. No.: 634,419

[52] U.S. Cl. ............................ 417/38; 417/44; 417/360; 138/30
[51] Int. Cl.² .................. F04B 49/00; F16L 55/04
[58] Field of Search ............... 417/36, 38, 44, 360, 417/902; 138/30

[56] References Cited
UNITED STATES PATENTS

| | | | |
|---|---|---|---|
| 2,172,057 | 9/1939 | Burns | 417/44 |
| 2,512,765 | 6/1950 | Byram | 417/44 |
| 2,633,081 | 3/1953 | Ruth | 417/360 |
| 3,209,785 | 10/1965 | Mercier | 138/30 |
| 3,593,744 | 7/1971 | Smith | 138/30 |
| 3,837,766 | 9/1974 | Cook | 417/902 |
| 3,931,834 | 1/1976 | Cailet | 138/30 |

*Primary Examiner*—William L. Freeh
*Attorney, Agent, or Firm*—Arnold, White & Durkee

[57] ABSTRACT

A water envelope pump and tank system configured with the water envelope and pump internal to the tank. The tank has first and second laterally opposed openings, fitted with externally protruding flanges, the openings disposed proximate to the bottom of the tank. A flexible envelope conforming in shape to a portion of the tank is positioned within the tank. The envelope has two openings corresponding to the tank openings located in two extended portions formed for fitting the tank flanges. The tank and envelope openings are sufficiently large to receive and encompass a pump system, comprising a pump and associated tubing, and a pump guard system. A means for sealing the envelope openings with respect to the tank is employed at the tank and envelope openings. A removably mounted motor is disposed outside the tank and communicates with the pump by a drive means passing through the second of the tank openings. External piping serving as the inlet and outlet piping for the envelope communicates through the first tank opening. In this manner, a compact and self-priming pumping system is configured which eliminates both waterlogging of the system and corrosion of the tank.

10 Claims, 5 Drawing Figures

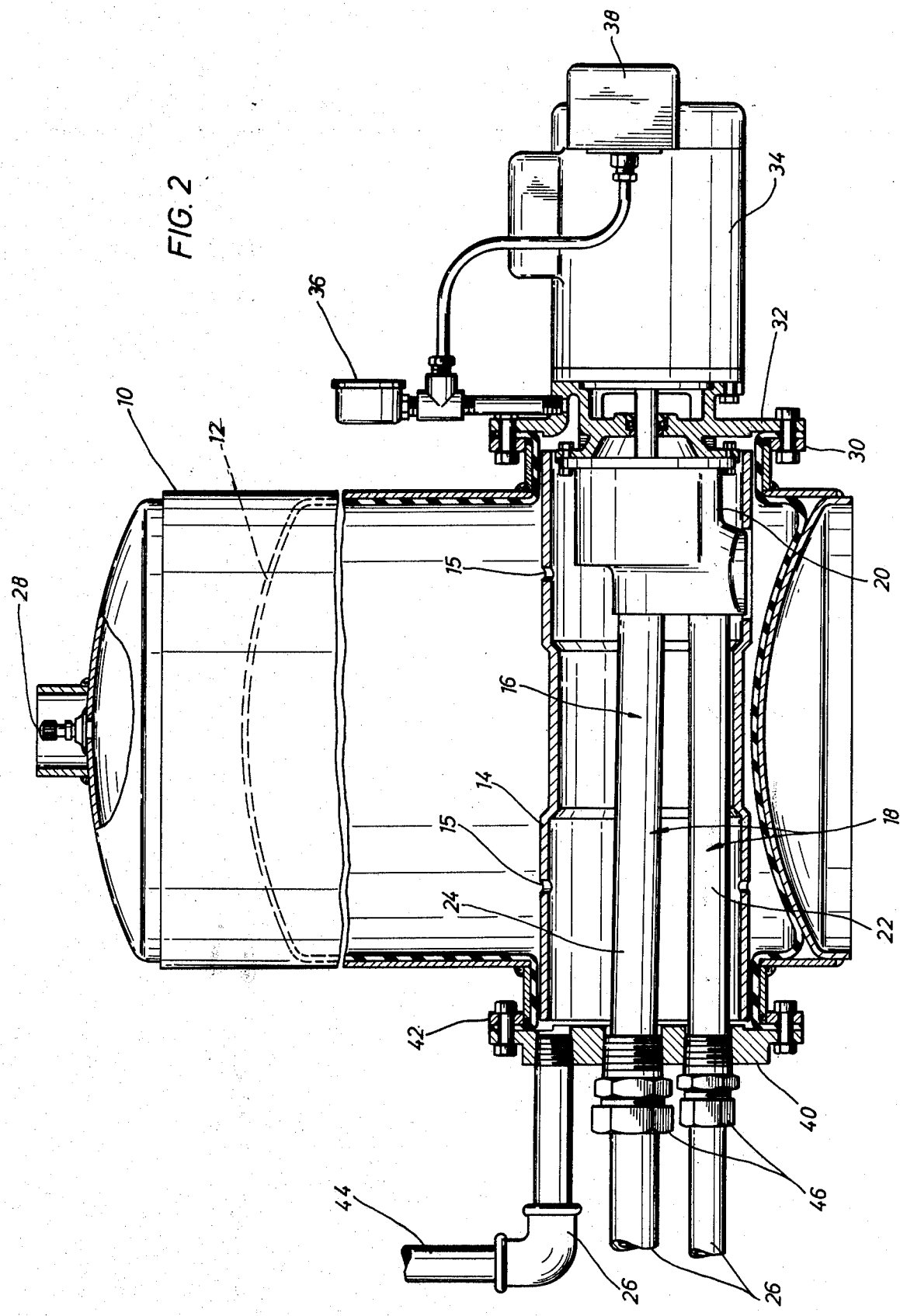

WATER ENVELOPE PUMP AND TANK SYSTEM

BACKGROUND OF THE INVENTION

The present invention relates to water pumps and more particularly, to a combination pressure tank, sealed-in envelope, and pump.

The purpose of a water pumping system is to provide water under pressure by employment of a power operated pump, together with devices to control the pump and store the water. Most commonly, the system is powered by an electric motor and incorporates a closed pressure tank. The four essential elements of such a system are: (1) pump; (2) tank; (3) pressure control; and (4) air control.

In the past, problems have existed in providing satisfactory and efficient water pumping systems, for example, for use in pumping water from water wells. The present invention is directed to improving such pumping systems by modifying the pump and tank design to incorporate an additional element of equipment.

The function of the tank in an automatic water system is to store water under pressure and make it available upon demand. Essentially, the water pressure is provided by a form of storable energy contained within the tank, air under pressure, which acts upon the water so as to force it from the tank to the point of use. When water is drawn from the tank, the air within the tank expands. When water is brought into the tank by a pump, the air is compressed. In this manner, water under pressure can be provided from the tank independent of whether the pump is running at that moment.

The water tank, therefore, not only prevents rapid cycling of the pump and pump motor which would otherwise occur instantaneously with water being drawn out, but it also provides water under pressure for delivery between pump cycles. However, the use of air under pressure to create water pressure carries with it a problem. Specifically, the difficulty is that of the mixing of air and water in the tank. This results from a basic characteristic of water which is its ability to absorb air. Thus, to insure a continuing pumping operation, it is necessary either to replenish the absorbed air, or in the alternative, to reduce or prevent air absorption.

The conventional pressure storage tank is a hydropneumatic tank in which both water and air are stored within the tank with no barrier separating the water from the air. This requires the use of an air volume control in order to maintain a predetermined amount of air within the tank. Periodic changes in air volume are the result of both the air being absorbed by the water and excess air within the pumped water being introduced into the tank. Moderate air volume changes can be regulated but excess air can cause the system to become air-bound or waterlogged in which case water pressure is lost. Recognition of the problem of waterlogging has led to alternative approaches in the design of hydropneumatic storage tanks. These alternatives include the floating wafer type of storage tank, the diaphragm type tank and the bag or envelope type tank.

The floating wafer tank uses a wafer or disc which rides on the surface of the water so as to reduce the air and water contact area. The tank still requires an air replenishment system, however, since the wafer does not completely separate the air from the water.

The diaphragm type pressure storage tank uses a sealed-in flexible separator which completely isolates the pressurized air from the water. Water pressure is maintained by the pressure of the air against the diaphragm. Typically, the tank is pre-charged at the factory to approximately the pump start pressure-a predetermined low pressure in the water system which activates the pressure switch to energize the motor and start the pump. An air volume control or air charging system is not required on this type of tank because of the air and water separation.

The bag or envelope type of pressure storage tank is similar to the diaphragm type tank with the exception that either the air or the water, depending on the configuration, is contained wholly within the envelope. This design is well known in the art and is recognized as a highly efficient means of both pressurizing the water system and eliminating waterlogging.

Although the bag or envelope can be used as the storage vessel for either the air or the water, the advantage of using the envelope as the water container is that the envelope will impart neither odor nor taste to the water as would be likely with the tank. Furthermore, the bag forms a completely corrosion-proof reservoir.

The significance of the envelope concept, however, is in its elimination of the air absorption problem. This results in the cycling frequency of the pump being greatly reduced, thereby increasing pump and motor life. In addition, there is no need for the complexity of air controls and air replenishment systems which characterize the conventional hydropneumatic storage tank.

Distinct from the incorporation of the envelop in the tank, the prior art also reflects important modifications relating to the physical placement of the pump. Prior systems, for example described in U.S. Pat. No. 2,403,555, have adapted the pump to fit within the tank to provide more satisfactory operation. In particular, the placement of the pump can be such as to insure that the pump will be submerged in water at all times with the result that the pump will be self-priming. A further advantage of the pump being internal to the tank is that the physical character of the pump and tank system will be that of a single unit very compact in configuration.

It is evident, therefore, that distinct advantages accrue from the use of the water envelope pressure tank and the internal pump system. Currently, there is no known system which incorporates both features. Thus, the present invention relates to a combination pressure tank envelope and internal pump system which carries with it the significant benefits of these two concepts.

SUMMARY OF THE INVENTION

This novel invention comprises a pressure tank, for example, a conventional cylindrical hydropneumatic storage tank, within which is placed an envelope of smaller volume of flexible, non-porous material, shaped and positioned so as to conform to a portion of the tank. The tank has a first and a second laterally opposed opening, fitted with external protruding flanges. The envelope has two corresponding openings located at the extremities of two protruding portions. The tank and envelope openings are sufficiently large to receive a pump system, comprising a pump and pump tubing, which extends between the opposing tank and envelope openings. Mounted above the pump system is a pump system guard for protecting the pump system from the pressure exerted by the envelope when the envelope is in a collapsed state.

A motor bracket is mounted to the external tank flange at the second tank opening. The bracket serves as the motor mount for the pump motor mounted externally to the tank with the pump motor connected to the pump by a drive means. In addition, the motor bracket serves to seal the second opening in the envelope with respect to both the interior and the exterior of the tank.

A service flange is mounted to the external tank flange at the first tank opening. The service flange positions and couples the pump tubing internal to the tank and the inlet and outlet piping external to the tank. The service flange also seals the first opening in the envelope with respect to both the interior and exterior of the tank.

In other words, the water envelope pump and tank system according to the invention comprises:

A pressure tank having first and second opposing openings proximate to the bottom thereof;

a flexible envelope disposed within and conforming to a portion of said tank, said envelope having openings corresponding to the openings in said tank;

means for sealing said envelope with respect to said openings in said tank;

a pump system including a pump and pump tubing disposed in the bottom of said tank within said envelope, said pump tubing exiting said tank through said first tank opening;

a pump system guard extending between said tank openings, the ends of said guard supported at said tank openings above said pump system for preventing said envelope from exerting pressure on said system when in a collapsed state; and a motor for driving said pump, said motor disposed outside said tank and communicating with said pump by a drive means passing through the second of said tank openings.

The object of this invention is to take advantage of both a water envelope and pump system mounted and contained within a storage pressure tank. There is no known similar configuration which combines both an envelope and pump internal to a pressure tank.

The foregoing, and other arrangements, features, and advantages of the invention, will become apparent from the following more particular description of the embodiment of the invention, as illustrated in the accompanying drawings.

BRIEF DESCRIPTION OF THE DRAWINGS

FIG. 2 is an elecation view of the system of FIG. 1, partially cross sectioned for detailing the envelope, pump system guard and pump system;

DETAILED DESCRIPTION

Figure 1:
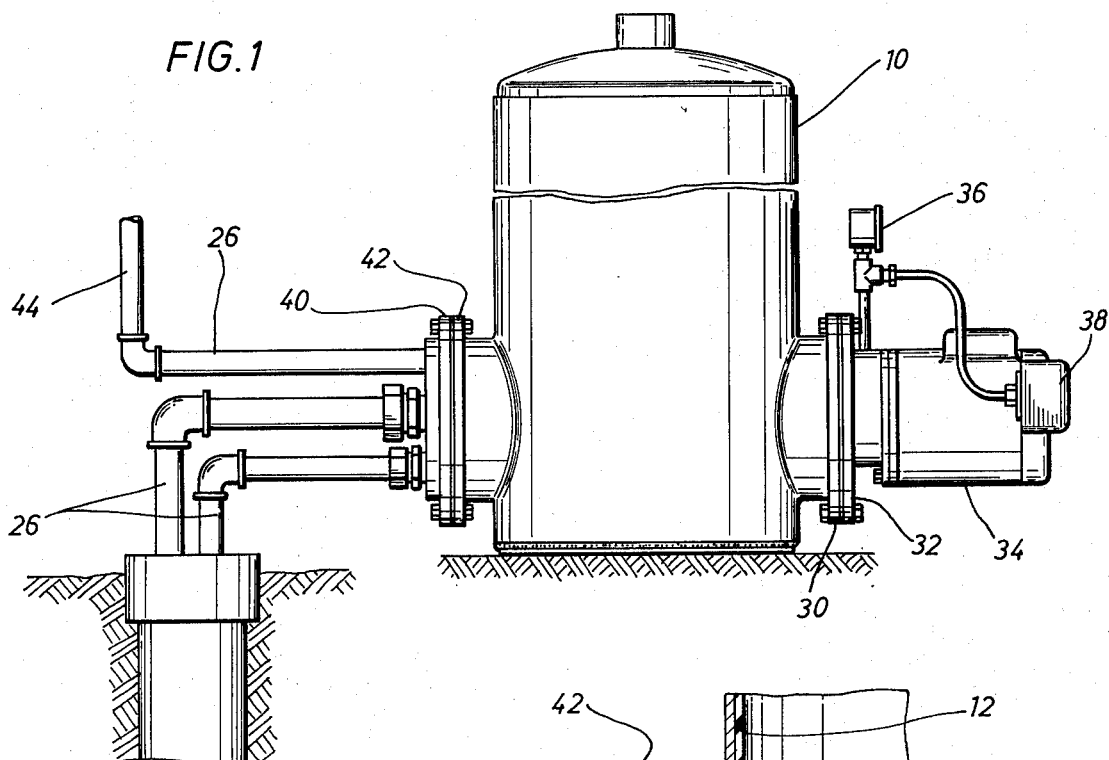
FIG. 1 shows a system according to the present invention, as applied to a well.

Referring to FIGS. 1 and 2, there is shown a pressure tank 10. Such pressure tanks are well known in the art and typically comprise a cylinder closed at its ends, mounted or seated in an upright position. In the illustrated configuration, tank 10 has first and second opposing openings, fitted with flanges 42 and 30, respectively, the openings being proximate to the bottom of the tank.

Figure 4:
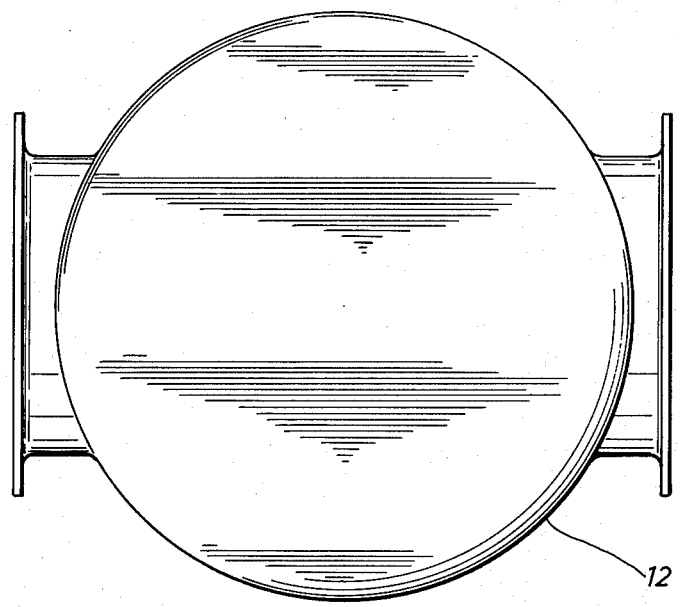
FIG. 4 is a top view of the system of FIG. 1 of the envelope.
Figure 5:
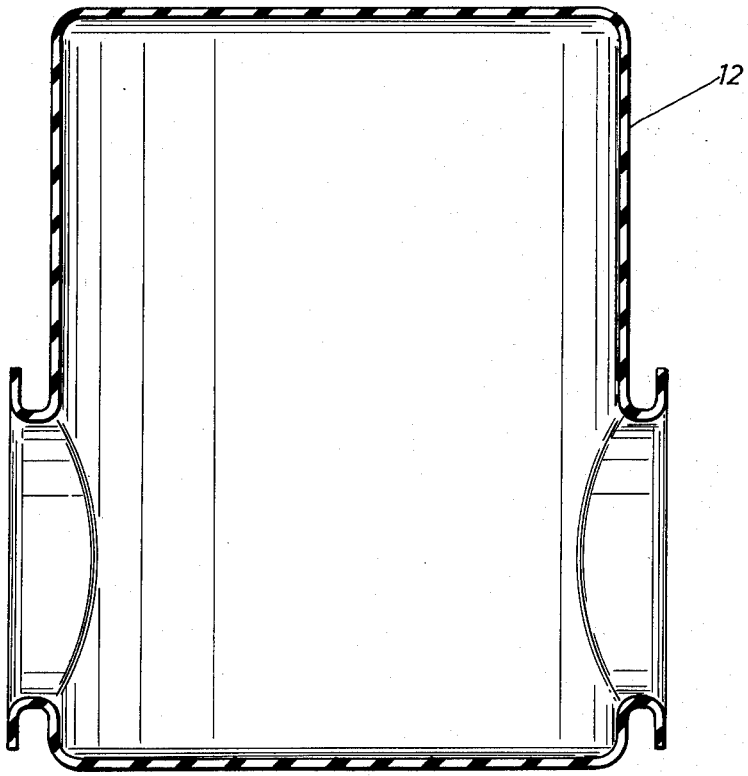
FIG. 5 is a cross sectional elevation view of the envelope.

Within tank 10, there is placed an envelope 12 of elastic non-porous material. Envelope 12, illustrated in FIGS. 4 and 5, has first and second openings corresponding to the tank openings, the envelope openings being located in two extending portions formed for fitting the tank flanges. The tank and envelope openings are sufficiently large to receive and encompass pump system 16, comprising pump 20 and pump tubing 18, and pump system guard 14. In the illustrated embodiment, pump tubing 18 is comprised of suction tube 22 and pressure tube 24. Depending upon the pump employed, pressure tube 24 may not be required, in which case only suction tube 22 would be necessary. As shown in FIGS. 1 and 2, pump tubing 18 is connected through external tubing 26 to a well or other suitable source.

Mounted to pump 20 and external tank flange 30 is motor bracket 32. Motor bracket 32 serves to seal envelope 12 with respect to tank 10. Motor bracket 32 also serves as the mount for pump motor 34. Seated on motor bracket 32 is pressure gauge 36 which is connected to pressure switch 38 mounted on pump motor 34.

Figure 3:
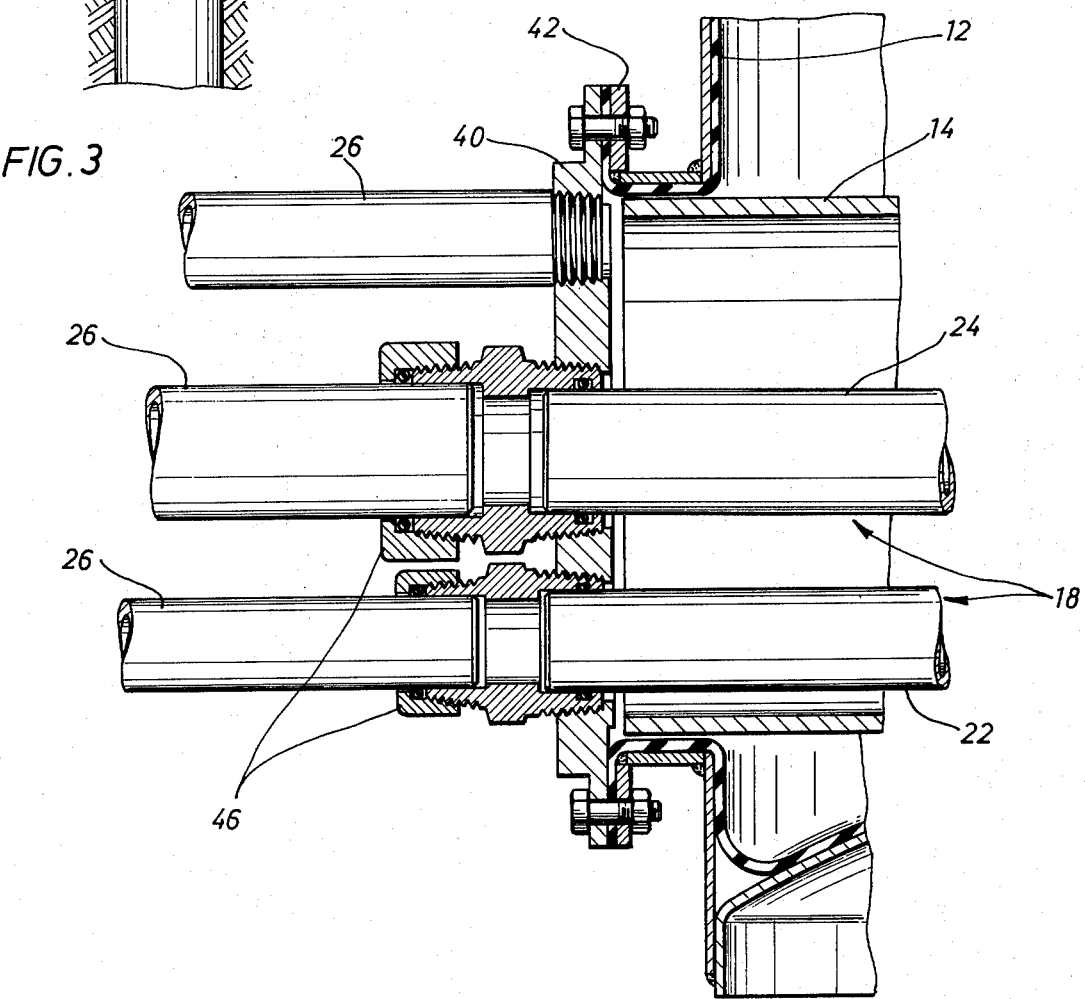
FIG. 3 is an enlarged, sectional view of part of the system of FIG. 1, primarily showing the service flange.

Service flange 40 is mounted to external tank flange 42 and engages and positions pump system guard 14 and pump tubing 18. Service flange 40 also serves to seal envelope 12 with respect to tank 10. External piping 26 is coupled to tank 10 through service flange 40 and couplings 46 as illustrated in FIG. 3.

In this fashion, motor bracket 32 and service flange 40 provide a secure seal for tank 10 in preventing fluid from escaping envelope 12 to either the interior or exterior of tank 10.

In operation, water is drawn into tank 10 by pump system 16 and is contained within envelope 12 with no direct contact between the water and tank 10. Water passes from pump 20 to envelope 12 via multiple orifices 15 in pump system guard 14.

The upper portion of tank 10 above envelope 12 is pressurized with air through air valve 28. As envelope 12 is filled with water, the envelope expands and compresses the air. As water is drawn from envelope 12 through service outlet 44, the air within tank 10 expands compressing envelope 12, thereby providing suitable outlet pressure.

When water is drawn from envelope 12, the pressure within the envelope will decrease and pressure switch 38, in reaction to pressure gauge 36, will be closed. In this manner, pump motor 34 and pump 20 will be started in order to draw in an additional supply of water to replenish that drawn off. Replenishment will continue until sufficient water pressure is built up to again open pressure switch 38 and stop pump motor 34 and pump 20.

Because of the unique shape of the envelope 12 and manner in which the envelope is sealed by and between flanges 30 and 42 and motor bracket 32 and service flange 40 respectively, the region of pressurized air in tank 10 above envelope 12 has no means by which to escape or to combine with the water contained in envelope 12. Thus, by the configuring of envelope 12 and its incorporation into tank 10, the need for an external air repressurization system is eliminated, in addition to the fact that waterlogging, which would otherwise result from the pressurized air combining with the water, is impossible.

Furthermore, because of the placement of pump system 16 in the lower portion of envelope 12 below service outlet 44, pump system 16 will always be submerged in the water contained in envelope 12, thus providing self-priming.

The foregoing description of the invention has been directed in primary part to a particular embodiment for purposes of explanation and illustration. It will be apparent, however, to those skilled in this art that many modifications, and changes in the specific apparatus described may be made without departing from the scope and spirit of the invention. For example, an alternative pump guard system could be substituted, comprising a series of rods positioned above the pump system and mounted between opposing motor bracket 32 and service flange 40.

What is claimed is:

1. A water envelope pump and tank system which comprises:
   a pressure tank having first and second opposing openings proximate to the bottom thereof;
   a flexible envelope disposed within and conforming to a portion of said tank, said envelope having openings corresponding to the openings in said tank;
   means for sealing said envelope with respect to said openings in said tank;
   a pump system including a pump and pump tubing disposed in the bottom of said tank within said envelope, said pump tubing exiting said tank through said first tank opening;
   a pump system guard extending between said tank openings, the ends of said guard supported at said tank openings above said pump system for preventing said envelope from exerting pressure on said system when said envelope is in a collapsed position; and
   a motor for driving said pump, said motor disposed outside said tank and communicating with said pump by a drive means passing through the second of said tank openings.

2. A water envelope pump and tank system as recited in claim 1, wherein said pump guard is a perforated tube rigidly mounted between said two opposing tank openings.

3. A water envelope pump and tank system as recited in claim 1, wherein said tank and envelope openings are sufficiently large to encompass said pump system and pump guard system.

4. A water envelope pump and tank system as recited in claim 1, further comprising a service flange removably affixed and external to said tank at said first tank opening for sealing said envelope with respect to said tank and for engaging said pump tubing and said guard.

5. A water envelope pump and tank system as recited in claim 1, further comprising a motor bracket removably affixed and external to said tank at said second tank opening for sealing said envelope with respect to said tank and for supporting said motor.

6. A water envelope pump and tank system as recited in claim 1, further comprising a pressure switch and a pressure gauge for controlling operation of said pump.

7. A water envelope pump and tank system as recited in claim 1, further comprising a service outlet at a level higher than said pump system thereby permitting self-priming of said pump system.

8. A water envelope pump and tank system as recited in claim 1, wherein said envelope is comprised of elastic nonporous material.

9. A water envelope pump and tank system as recited in claim 1, further comprising first and second protruding flanges around said first and second tank openings, respectively;

10. A water envelope pump and tank system as recited in claim 9, wherein said envelope has two opposing, laterally extending portions proximate to the bottom of said envelope for fitting said protruding flanges.

* * * * *